Oct. 27, 1953  E. P. BULLARD III ET AL  2,657,064
FLOATING CHUCK
Filed Oct. 1, 1949  2 Sheets-Sheet 1

INVENTORS
EDWARD P. BULLARD, III
ARTHUR A. TOMENCEAK
BY
ATTORNEY

Oct. 27, 1953   E. P. BULLARD III ET AL   2,657,064
FLOATING CHUCK
Filed Oct. 1, 1949   2 Sheets-Sheet 2
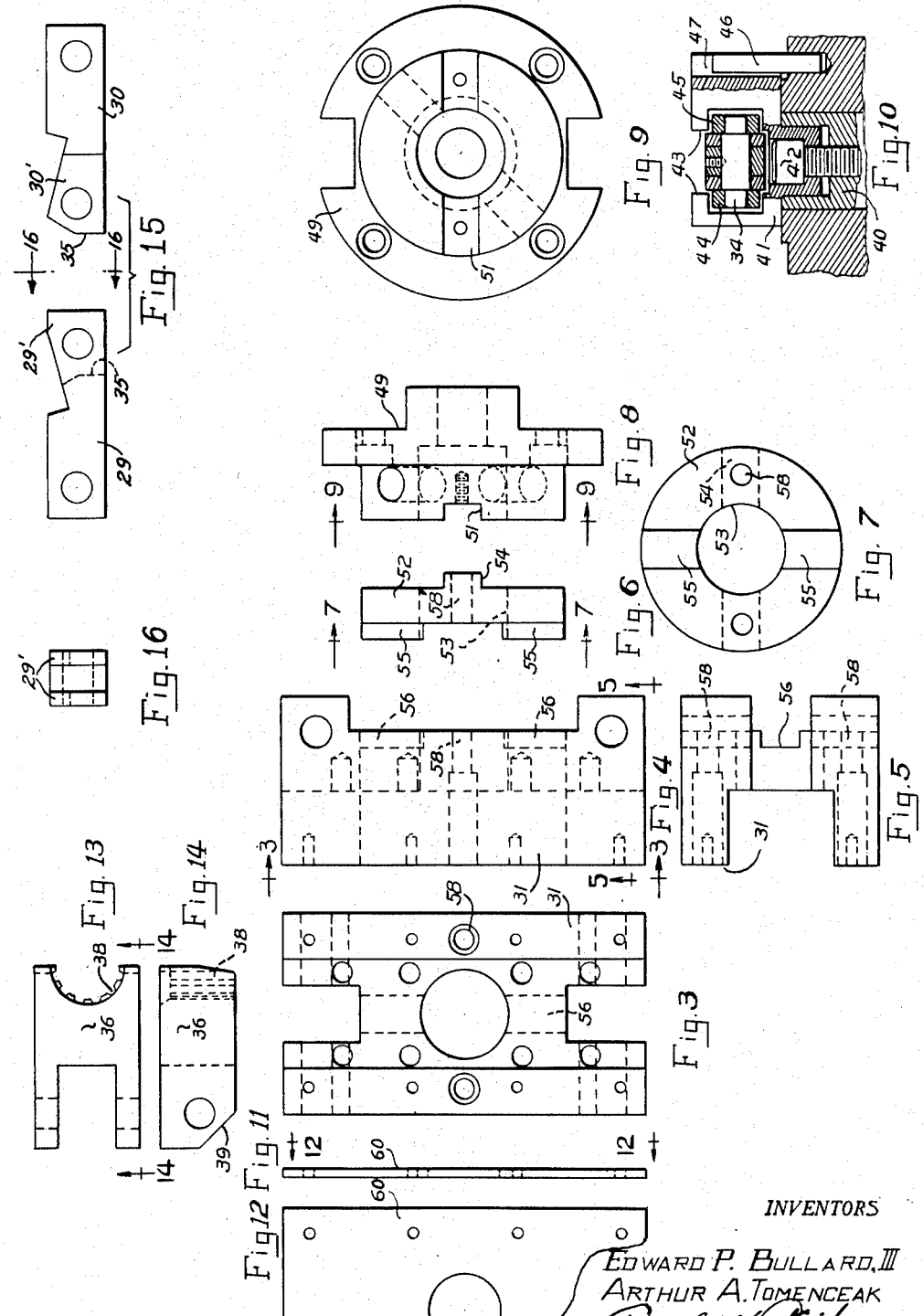
INVENTORS
EDWARD P. BULLARD, III
ARTHUR A. TOMENCEAK
By Paul M. Cist
ATTORNEY Patented Oct. 27, 1953

2,657,064

UNITED STATES PATENT OFFICE 2,657,064

FLOATING CHUCK

Edward P. Bullard III, Fairfield, and Arthur A. Tomenceak, Bridgeport, Conn., assignors to The Bullard Company, a corporation of Connecticut Application October 1, 1949, Serial No. 119,178

8 Claims. (Cl. 279—16)

This invention relates to machine tools, and particularly to a new and improved chuck jaw assembly.

So-called floating chuck jaw assemblies are employed on centered work in lathes for the purpose of ensuring accurate alignment of the centers of the machine and the centers of the work piece to be machined. They are designed to prevent uneven forces from being applied to the work in gripping it, which forces tend to move the work off the machine centers.

Prior-known, so-called floating chuck jaw assemblies are effective only to the point where the jaws contact the work. As pressure is applied to them from this point, they become rigidly attached to the chuck jaw actuator that is associated with the spindle. Accordingly, any adverse forces created by the rotation of the spindle are transmitted to the chuck jaws through the actuator, thereby tending to defeat the purpose for which the assembly was designed.

An object of this invention is to provide a chuck jaw assembly that will overcome the disadvantages encountered with known constructions of this type.

Other objects include the provision of a multi-jaw chuck assembly wherein the chuck jaws are 100% floating, even after gripping pressure has been applied to them; the provision of such a chuck jaw assembly wherein the actuator member or its equivalent is completely disconnected from the jaw-actuating elements when the latter are in gripping position; and the provision of such a chuck jaw assembly in which a toggle construction is employed to actuate the chuck jaws, and in which a lost-motion connection is provided between the toggle construction and the actuator.

The above, as well as other objects and novel features of the invention will become evident from the following specification and accompanying drawings, in which:

Figs. 3, 4 and 5 are three views of the driven member of a coupling forming a part of the chuck jaw assembly;

Figs. 6 and 7 are two views of an intermediate member of the coupling forming part of the chuck jaw assembly;

Figs. 8 and 9 are two views of the driving member of the coupling forming part of the assembly;

Fig. 10 is a sectional view taken along line 10—10 of Fig. 1, but rotated through 90°;

Figs. 11 and 12 are two views of one of the elements comprising the chuck jaw assembly;

Figs. 13 and 14 are two views of the chuck jaws;

Fig. 15 is a view of a toggle link construction with the links in spaced relation for clarity; and Fig. 16 is a view looking in the direction of the arrows along line 16—16 of Fig. 15.

Figure 1:
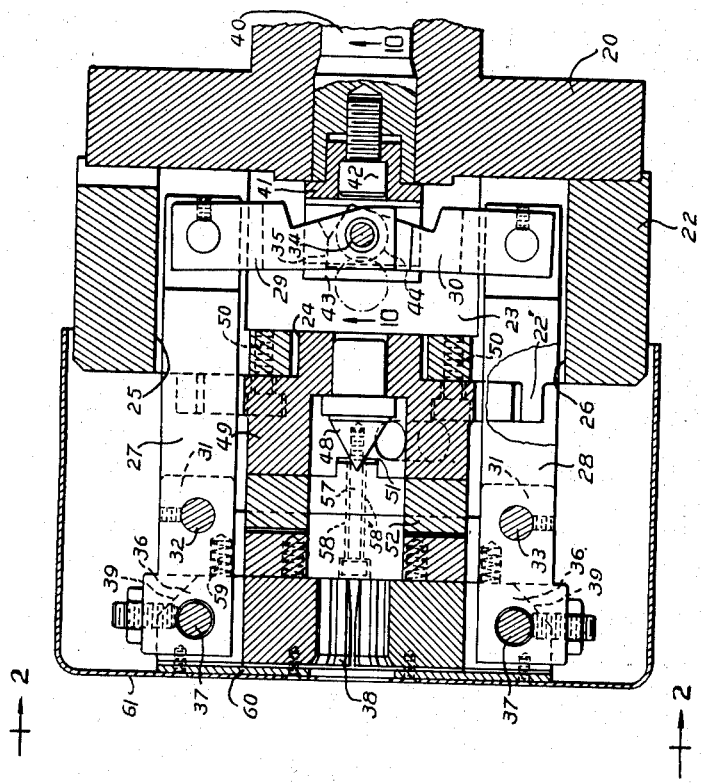
Figure 1 is a sectional view of a chuck jaw assembly to which the principles of the invention have been applied.
Figure 2:
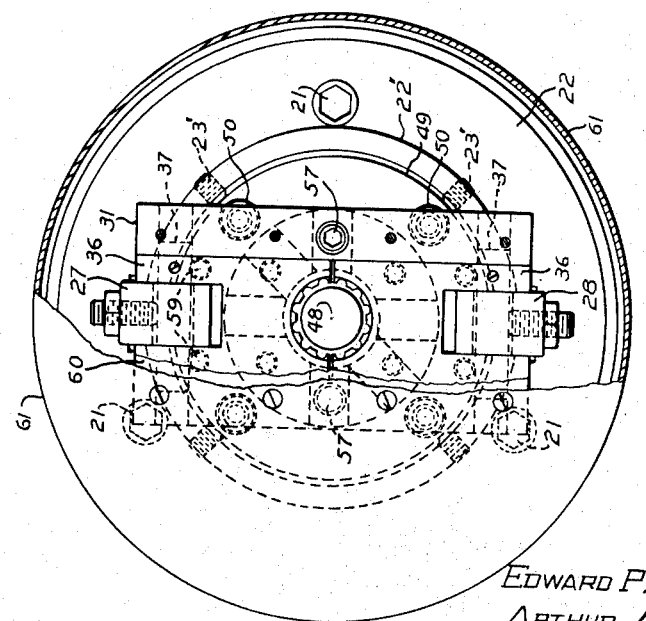
Fig. 2 is an end view of the apparatus shown in Fig. 1, looking in the direction of the arrows 2—2 of Fig. 1.

Referring to Fig. 1, a spindle 20 has bolted to it, by bolts 21 (Fig. 2), a circular fixture body member 22 that is recessed at 23 and provided with a bore 24. Rectangular slots 25, 26 are formed in the body member 22 for the reception of jaw levers 27, 28. Although only two chuck jaws are to be employed in the present embodiment, a greater number may be used with equal facility. Referring to Figs. 1, 15 and 16, the ends of the jaw levers 27, 28 within the body member 22 are pivoted to the outer ends of separate toggle links 29 and 30, respectively, while said levers 27, 28, intermediate their ends, are pivoted to a bracket 31 (see Figs. 3, 4 and 5) by pins 32, 33 for a purpose to be described later. The inner ends of the toggle links 29, 30 are pivoted together by a pin 34. The link 29 is provided with a bifurcated end 29' (Fig. 16) that receives a tongue 30' formed on the inner end of the link 30. Abutting surfaces 35 are provided between the end of the tongue of link 30 and the crotch of the bifurcated portion of link 29 which cooperate to limit the rightward (Fig. 1) motion of the links 29, 30 to a predetermined short distance past dead center.

The outer ends of jaw levers 27 and 28 have pivoted to them identical chuck jaws 36 by fulcrum pins 37. Referring to Figs. 13 and 14, the jaws 36 include bifurcated body members with an arcuate gripping surface 38 that is not exactly circular to facilitate engaging a cylindrical work piece of a pre-determined diameter, the outer peripheral surface of which may vary. The arcuate surface is relieved intermittently to provide adequate gripping action without moving the work. Each jaw is additionally provided with an inclined surface 39 which permits the jaw to be pivoted outwardly about its pin 37 for a purpose to be described later.

Movement of the jaw levers 27, 28 about their pivot pins 32, 33 is effected by an actuator sleeve 40 that passes through a bore along the axial centerline of the spindle 20. The end of sleeve 40 nearest the toggle links 29, 30 is bored to receive a connector 41 that is fixed to it by screw 42. Connector 41 is provided with a clevis 43 that connects to the pivot 34 of the toggle links 29, 30 through rollers 44, 45. The connector 41 is prevented from rotating by a pin 46 that cooperates with a slot 47 formed in the connector 41.

The connection between clevis 43 and the rolls 44, 45 is such that in the position shown in the drawings, clearance exists at all points between the clevis 43 and rolls 44, 45. This is occasioned by the fact that as the actuator sleeve is moved from left to right (Fig. 1), it draws the toggle links 29, 30 to their "dead center" position, whereupon they snap past dead center and become disassociated from the actuator sleeve. Accordingly, the clearance shown in Fig. 10 between the clevis 43 and rolls 44, 45 exists. In the position shown in Fig. 1, the jaws 36 are in gripping position and grip the work by a force incident to the spring action of jaw levers 27, 28 in being forced about their pivots 32, 33 by the toggle links moving to the position shown in Fig. 1 with actuator sleeve 40 as far to the right as possible.

Movement of the actuator sleeve 40 to the left from the position shown in Fig. 1, causes the roller 44 (Fig. 1) to move from its dotted line position to the dot and dash line position, thereby breaking the toggle link joint and releasing the jaws 36 from their gripping position.

In order to fulfill the objects of this invention, it is necessary that the jaws 36 be capable of universal movement relatively to a center 48 that is fixed to the body member 22 so that its axial centerline is coincident with that of the spindle 20. This has been accomplished by providing an "Oldham" coupling between the bracket 31 and the body member 22.

A coupling bottom 49 (Figs. 8 and 9) is fixed to the body member by screws 50. It includes a bore and counterbore for receiving the center 48, as well as an interrupted coupling slot 51. In order to adjust the center 48 for perfect alignment with the axis of spindle 20, clearance is provided between the shanks of screws 50 and the holes in member 49 through which they pass. Additionally, a flange 22' of body 22 extends outwardly around member 49, and set screws 23' (Fig. 2) are used to effect such adjustment. A coupling center 52 (Figs. 6 and 7) is provided with a bore 53 for receiving the work. And, a tongue construction 54 is provided on its one face adapted to mesh with the slot 51. The opposite face of the coupling center 52 is provided with another tongue construction 55 at right angles to the construction 54. The construction 55 meshes with an interrupted slot 56 formed in the one face of the bracket 31 (Fig. 4). The assembly, including bracket 31, coupling center 52 and coupling bottom 49, is loosely held together for limited universal movement by screws 57. The shanks of the screws 57 are of substantially less diameter than aligned holes 58, 58' in the members 31 and 52. Threaded ends on screws 57 take into threaded holes in member 49. Accordingly, limited universal movement of bracket 31, and therefore levers 27, 28 and jaws 36, relative to center 48 is possible so that a center in a work piece can be made to seat on the center 48 when clamped by jaws 36, regardless of the trueness of the outer periphery of the work piece and without straining the center 48. Additionally, inasmuch as there is clearance between the clevis 43 and the rollers 44, 45, no strains are applied to the clamping jaws by virtue of their rotation even though they do not rotate true about the axial centerline of the spindle 20.

In order to make it possible to remove center 48 without disassembling the Oldham coupling, the jaws 36, as previously stated, are pivoted about their pins 37. Springs 59 are provided between the bracket 31 and the jaws 36, urging them away from the bracket, and a cover plate 60 is fixed to the bracket 31 to complete the assembly. A hood 61 covering the entire assembly is also held to bracket 31 by the screws that hold cover plate 60 thereto.

Although the various features of the improved floating chuck have been shown and described in detail to fully disclose one embodiment of the invention, it will be evident that numerous changes may be made in such details, and certain features may be used without others without departing from the principles of the invention.

What is claimed is:

1. A floating chuck jaw assembly comprising in combination, a body adapted to be mounted on a spindle for rotation therewith; a machine center in said body adapted to be rotated with said body; movable jaws mounted in said body and adapted to grip work when the latter is on said machine center; pivoted levers mounted in said body supporting said jaws; means within said body for providing limited universal movement of said supporting levers relatively to said center, and a toggle joint mounted in said body for pivoting said levers to thereby actuate said jaws to grip said work, said toggle joint forming with said machine center, jaws, pivoted levers, and universal movement-providing means a self-contained unit whereby external forces will not affect the universal action of said universal movement-providing means.

2. A floating chuck jaw assembly comprising in combination, a body adapted to be mounted on a spindle for rotation therewith; a machine center mounted within said body and adapted to be rotated with said body; movable jaws within said body adapted to grip work when the latter is on said machine center; pivoted levers within said body for supporting said jaws; a toggle joint construction within said body for applying a deflecting force to said levers for maintaining said jaws in work-gripping position under a predetermined force; means within said body for providing limited universal movement of said levers relatively to said center; and means associated with said toggle joint adapted to become effective by the deflecting force of said levers to lock said joint in a position where the jaws are in work-gripping position and said machine center, jaws, pivoted levers, and universal movement-providing means form a self-contained unit whereby external forces will not affect the universal movement of said universal movement-providing means.

3. A floating chuck jaw assembly comprising in combination, a body adapted to be mounted on a spindle for rotation therewith; a machine center within said body adapted to be rotated with said body; movable jaws within said body adapted to grip work when the latter is on said machine center; pivoted levers within said body for supporting said jaws; a toggle joint construction within said body for applying a deflecting force to said levers for maintaining said jaws in work-gripping position under a pre-determined force; and an actuator for said toggle joint adapted to move it beyond a dead-center position where the deflection force of said levers maintains it in a position providing clearance between said toggle joint and said actuator.

4. A floating chuck jaw assembly comprising in combination, a body adapted to be mounted on a spindle for rotation therewith; a machine center within said body adapted to be rotated with said body; movable jaws within said body adapted to grip work when the latter is on said machine center; means within said body for supporting said jaws; means within said body for moving said jaws; and an actuator for said jaw-moving means adapted to become disassociated with said jaw-moving means when said jaws are in work-gripping positon.

5. A floating chuck jaw assembly comprising in combination, a body adapted to be mounted on a spindle for rotation therewith; a machine center within said body and adapted to be rotated with said body; movable jaws within said body adapted to grip work when the latter is on said machine center; means within said body for supporting said jaws for movement to and from work-gripping position; an actuator connected to said jaw-moving means and adapted to become disassociated with said jaw-moving means when said jaws are in work-gripping position; and means within said body for providing limited universal movement of said supporting means relatively to said center.

6. A floating chuck jaw assembly comprising in combination, a body adapted to be mounted on a spindle for rotation therewith; a machine center within said body and adapted to be rotated with said body; pivotal jaws within said body adapted to grip work when the latter is on said machine center; pivotally-mounted levers within said body adapted to move said jaws into and out of work-gripping position; a toggle joint construction within said body adapted to operate said jaw-moving levers; and an actuator connected to said toggle joint construction for operating said toggle joint construction and adapted to become disassociated therewith upon moving said toggle joint construction to a position for moving said jaws into work-gripping position.

7. A floating chuck jaw assembly comprising in combination, a body adapted to be mounted on a spindle for rotation therewith; a machine center within said body adapted to be rotated with said body; pivotal jaws within said body adapted to grip work when the latter is on said machine center; pivotally-mounted levers within said body adapted to support and to move said jaws into and out of work-gripping position; a toggle joint construction within said body adapted to operate said jaw-moving levers; an actuator for operating said toggle joint construction and adapted to become disassociated therefrom upon moving said toggle joint construction to a position for moving said jaws into work-gripping position; and means within said body for providing limited universal movement of said supporting means relatively to said center.

8. A floating chuck jaw assembly comprising in combination, a body adapted to be mounted on a spindle for rotation therewith; means attached to said body and adapted to support a machine center for rotation with said body; pivotal jaws within said body adapted to grip work when the latter is on said machine center; pivotally-mounted levers within said body for supporting and for moving said jaws; a toggle construction within said body for operating said levers; an actuator for said toggle construction; and a plate between said jaw-supporting means and said center-supporting means providing therewith an Oldham type coupling whereby said supporting means may move universally relatively to said center.

EDWARD P. BULLARD III.
ARTHUR A. TOMENCEAK.

References Cited in the file of this patent

UNITED STATES PATENTS

| Number | Name | Date |
|---|---|---|
| 1,130,123 | Ward | Mar. 2, 1915 |
| 1,376,791 | Baker | May 3, 1921 |
| 1,780,390 | Hopkins | Nov. 4, 1930 |
| 2,399,290 | Nightingale | Apr. 30, 1946 |